(No Model.) 2 Sheets—Sheet 1.
S. B. FLYNT.
COMBINED HARROW AND CLOD CRUSHER.
No. 510,126. Patented Dec. 5, 1893.
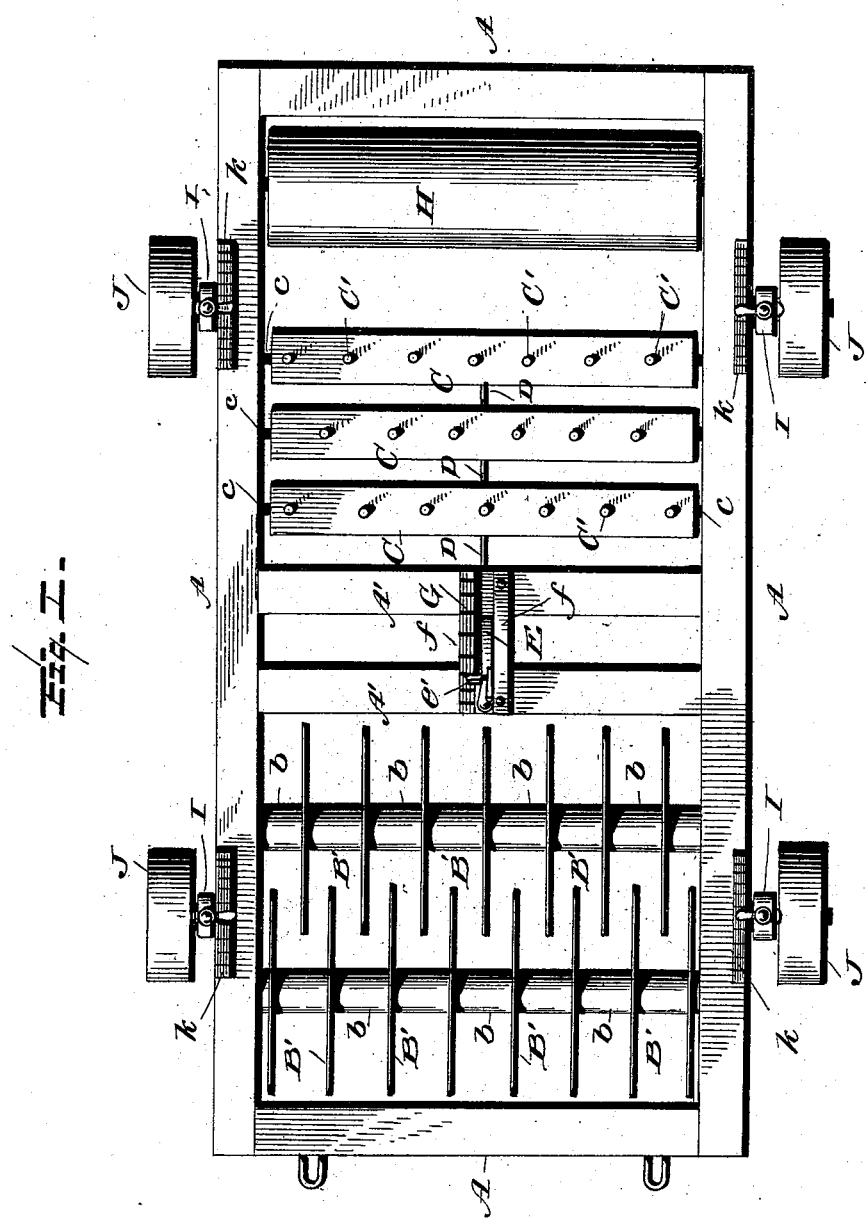
Fig. I.
Witnesses:
L. C. Hills
E. S. Trull
Inventor
Samuel B. Flynt,
by Franklin H. Hough
Attorney
THE NATIONAL LITHOGRAPHING COMPANY,
WASHINGTON, D. C.

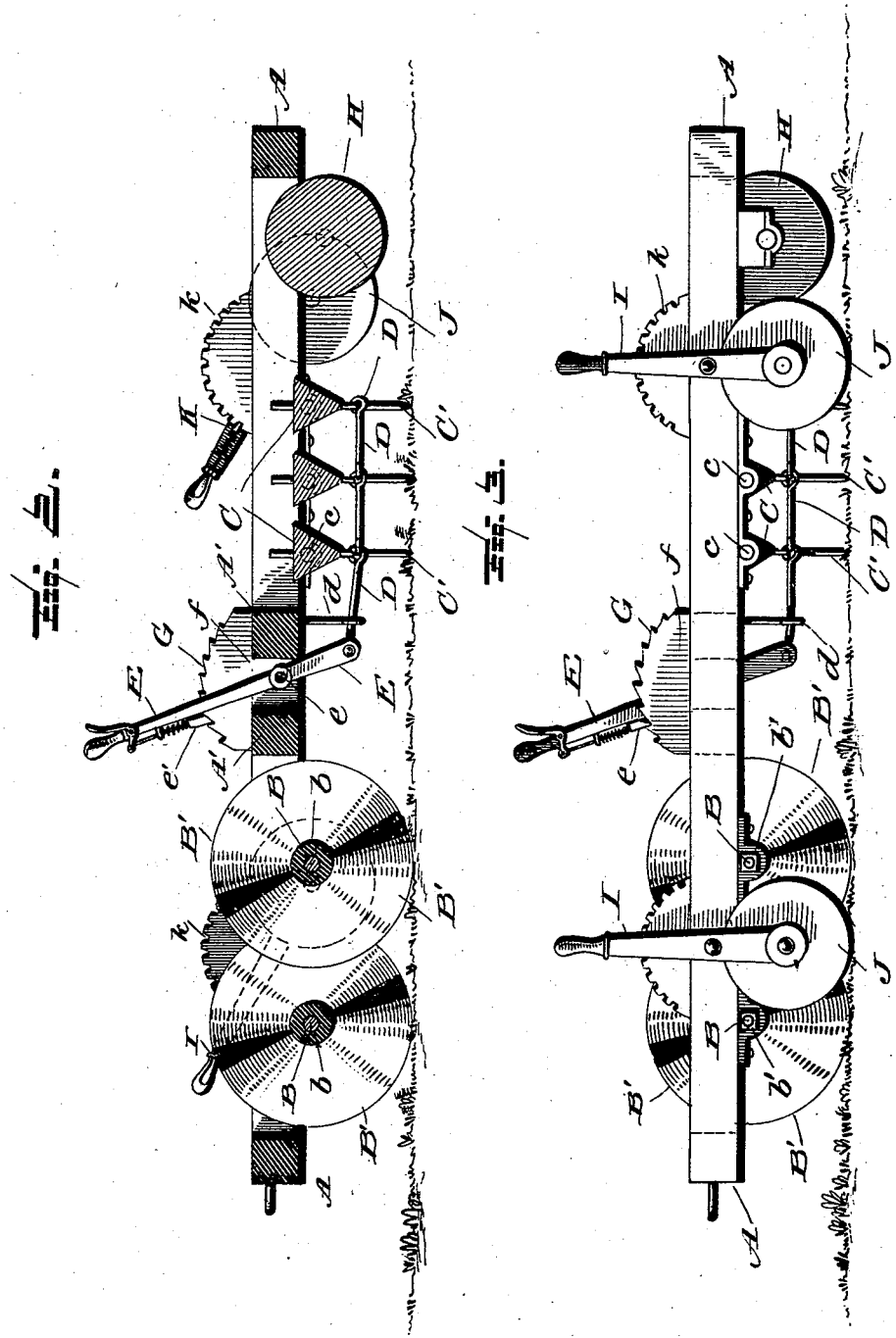

UNITED STATES PATENT OFFICE.

SAMUEL B. FLYNT, OF AMORY, MISSISSIPPI.

COMBINED HARROW AND CLOD-CRUSHER.

SPECIFICATION forming part of Letters Patent No. 510,126, dated December 5, 1893.

Application filed June 27, 1893. Serial No. 478,950. (No model.)

*To all whom it may concern:*

Be it known that I, SAMUEL B. FLYNT, a citizen of the United States, residing at Amory, in the county of Monroe and State of Mississippi, have invented certain new and useful Improvements in a Combined Harrow and Clod-Crusher; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in agricultural implements of that class embodying a harrow, and a clod crusher, and it has for its objects among others to provide an improved device of this character which shall be simple and cheap in its construction, durable, and efficient in operation.

I provide a suitable frame in which are supported axles on which are alternately-arranged stalk cutters or disks which are secured on their axles by suitable devices, as nuts, whereby they can be easily tightened should they become loose. To the rear of the cutters or disks are pivotally journaled shafts or bars which carry teeth, the said bars being connected to move in unison and all adapted to be operated by a lever, to adjust them up or down as may be desired. To the rear of the bars with teeth is arranged a clod crusher or leveler which is preferably carried by a shaft which is removably journaled so that it can be removed when it is not desired to use the same. At each corner of the frame is provided a wheel which is carried by a pivoted lever, the said wheels being used for lightening the draft and for carrying the machine from one field to another; the levers carrying the wheels may be held in their adjusted position in any suitable manner, as by means of spring latches engaging cogs or teeth on the frame.

Other objects and advantages of the invention will hereinafter appear and the novel features thereof will be specifically defined by the appended claim.

The invention in the present instance resides in the peculiar combinations, and the construction, arrangement and adaptation of parts, all as more fully hereinafter described, shown in the drawings and then particularly pointed out in the claim.

The invention is clearly illustrated in the accompanying drawings, which, with the letters of reference marked thereon, form a part of this specification and in which—

Figure 1 is a top plan of my improved device. Fig. 2 is a central vertical longitudinal section through the same. Fig. 3 is a side elevation of the same.

Like letters of reference indicate like parts throughout the several views.

Referring now to the details of the drawings by letter, A designates the frame which is rectangular in form with its longitudinal and cross timbers secured together in any suitable manner. At or near its longitudinal center there are the cross pieces A' which are arranged quite close together with a slight space between them as shown in Fig. 1 for a purpose which will soon be made apparent. Near the front end of the frame are journaled the shafts B which are suitably removably journaled in suitable bearings or boxes on the under side of the frame, and on these shafts are the cutting rollers or disks B', which may be of any well known or preferred form held on the shafts with spacing blocks *b* between each two cutters or disks and at the ends may be provided adjusting nuts *b'* by means of which the cutters may be tightened when they become loose. The cutters on the two shafts are arranged alternately, that is, so that the cutters on one shaft will alternate with those on the other shaft as shown in Fig. 1; by this means the cutters can be set closer together and they will be found to perform better work.

Forward of the center of the frame, and just in front of the clod crusher or leveler soon to be described, and just to the rear of the cross pieces A', are pivotally mounted in any suitable manner as by hangers *c* the transverse bars C which are provided with the teeth C' of any preferred form of construction. The under sides of the said bars are pivotally connected as by the links or rods D the forward one of which passes through a suitable guide *d* on the under side of one of the cross pieces A' as shown and is pivotally connected with the lower end of the lever E which is pivoted as at *e* between the longitudinal pieces *f* secured to the upper faces of the pieces A' as shown and working between the same and in the space between the pieces A'. By the manipulation of this lever the bars with their teeth may be simultaneously operated to give different inclinations to the teeth or to throw them higher or lower as may be desired. This lever may be held in its adjusted position by the spring pawl *e'* engaging a notched quadrant G on one of the pieces *f* as shown. To the rear of the toothed bars is removably journaled a clod crusher or leveler H which may be of any suitable form of construction suited to the work.

At or near each corner of the frame to the outer faces of the longitudinal timbers thereof is pivoted a lever I in the lower end of which is journaled a stub shaft carrying a wheel J. By the movement of these levers the wheels may be thrown up out of the way during the operation of the machine, or they may be thrown down to lighten the draft, as for instance when moving the machine from one field to another or from the barn to the field. These levers are designed to be held in their adjusted positions by the spring latches or pawls K on the levers engaging the ratchets or toothed quadrants *k* on the frame as shown.

The operation will be readily understood from the foregoing description when taken in connection with the annexed drawings, and a further detailed description thereof is not deemed necessary.

The independent adjustment of the side wheels is important, as it permits me to adapt the machine for side-hill work or for use upon land of uneven surfaces. Any one of the wheels can be placed in any desired position by simple manipulation of its lever without affecting any of the other wheels.

The device is simple, cheap of manufacture, composed of few parts, those readily assembled and not liable to get out of order, and, in practice, has proved most efficient for the purposes for which it is intended.

What I claim as new is—

The harrow described composed of the frame, the shafts with cutting disks alternating on the two shafts, the pivoted bars with teeth, the lever and connections for adjusting the same, and the clod crusher or leveler, at the rear of the same, all substantially as shown and described.

In testimony whereof I affix my signature in presence of two witnesses.

SAMUEL B. FLYNT.

Witnesses:
JOHN M. YOUNG,
THAD. W. JONES.